United States Patent
Nefcy et al.

(10) Patent No.: US 9,707,953 B2
(45) Date of Patent: Jul. 18, 2017

(54) METHODS AND SYSTEMS FOR IMPROVING HYBRID VEHICLE GEAR SHIFTING

(71) Applicant: Ford Global Technologies, LLC, Dearborn, MI (US)

(72) Inventors: Bernard D. Nefcy, Novi, MI (US); Daniel Colvin, Farmington Hills, MI (US); Marvin Paul Kraska, Dearborn, MI (US); Matthew John Shelton, Grosse Ile, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 186 days.

(21) Appl. No.: 14/302,182

(22) Filed: Jun. 11, 2014

(65) Prior Publication Data
US 2015/0360674 A1  Dec. 17, 2015

(51) Int. Cl.
| | |
|---|---|
| *B60W 10/196* | (2012.01) |
| *B60W 30/19* | (2012.01) |
| *B60W 30/18* | (2012.01) |
| *B60W 10/08* | (2006.01) |
| *B60K 6/387* | (2007.10) |
| *B60K 6/547* | (2007.10) |
| *B60W 10/115* | (2012.01) |
| *B60W 20/30* | (2016.01) |
| *B60W 20/14* | (2016.01) |
| *B60K 6/48* | (2007.10) |

(52) U.S. Cl.
CPC ........ *B60W 10/196* (2013.01); *B60K 6/387* (2013.01); *B60K 6/547* (2013.01); *B60W 10/08* (2013.01); *B60W 10/115* (2013.01); *B60W 20/14* (2016.01); *B60W 20/30* (2013.01); *B60W 30/18127* (2013.01); *B60W 30/19* (2013.01); *B60K 2006/4825* (2013.01); *B60W 2710/083* (2013.01); *B60W 2710/1005* (2013.01); *Y10S 903/947* (2013.01); *Y10T 477/347* (2015.01)

(58) Field of Classification Search
CPC ............ Y10T 477/347; Y10S 903/947; Y10S 903/93; B60W 20/108; B60W 10/196; B60W 30/19; B60W 30/18127
See application file for complete search history.

(56) References Cited

U.S. PATENT DOCUMENTS

| | | | |
|---|---|---|---|
| 8,224,513 B2 | 7/2012 | Soliman et al. | |
| 8,540,604 B1 | 9/2013 | Nefcy et al. | |
| 2009/0233757 A1 | 9/2009 | Soliman et al. | |
| 2012/0101697 A1 | 4/2012 | Hawkins et al. | |
| 2012/0265382 A1* | 10/2012 | Nefcy .................. | B60W 10/06 701/22 |
| 2013/0210575 A1* | 8/2013 | Kumazaki ............... | B60K 6/48 477/20 |

OTHER PUBLICATIONS

Anonymous, "Real-time Gear Shift Advisory System to Improve Fuel Economy," IPCOM No. 000235514, Published Mar. 5, 2014, 4 pages.

* cited by examiner

*Primary Examiner* — Stacey Fluhart
(74) *Attorney, Agent, or Firm* — David Kelley; John D. Russell; B. Anna McCoy

(57) ABSTRACT

Systems and methods for improving transmission shifting of a hybrid vehicle are presented. In one example, output torque of an electric machine is adjusted in response to a downshift of a fixed step ratio transmission during regenerative braking. The output torque of the electric machine may be adjusted in response to a phase of the transmission shift.

19 Claims, 4 Drawing Sheets

METHODS AND SYSTEMS FOR IMPROVING HYBRID VEHICLE GEAR SHIFTING

FIELD

The present description relates to a system and methods for improving transmission gear shifting during regenerative braking conditions. The methods may be particularly useful for hybrid vehicles that include a driveline disconnect clutch positioned between an engine and an electric machine.

BACKGROUND AND SUMMARY

A hybrid vehicle may recover and store a vehicle's kinetic energy during conditions where driver demand torque is low. Specifically, the vehicle's kinetic energy may be converted into electrical energy that is stored in an electric energy storage device. The stored electrical energy may be utilized at a later time to accelerate the vehicle so that the vehicle consumes less hydrocarbon based fuel. The electric machine may also provide vehicle braking when the vehicle's kinetic energy is regenerated into electric energy via producing and applying a negative torque to the hybrid vehicle's driveline. In series hybrid vehicles that include a driveline disconnect clutch, the disconnect clutch and electric machine may increase driveline inertia such that a driver may notice a driveline torque disturbance during transmission shifting while the vehicle is in a regenerative braking mode.

The inventors herein have recognized the above-mentioned disadvantages and have developed a method for operating a driveline, comprising: adjusting torque output of an electric machine during a torque transfer phase of a transmission shift from a first fixed gear ratio to a second fixed gear ratio while the electric machine is providing regenerative braking to the driveline.

By reducing an amount of negative torque applied to a driveline via an electric machine during regenerative braking and downshifting from a higher gear to a lower gear, it may be possible to provide the technical result of reducing driveline torque disturbances. Reducing negative torque output of the electric machine allows transmission output torque to gradually transition to a lower level instead of abruptly decreasing as transmission clutches are simultaneously applied and released. For example, the electric machine negative torque may be reduced during a torque transfer phase of the downshift. Additionally, in some examples, electric machine negative torque may be further reduced during an inertia phase of the downshift.

The present description may provide several advantages. In particular, the approach may reduce driveline torque disturbances. Reducing driveline torque disturbances may include reducing torque holes where transmission output torque may be reduced more than desired. Further, the approach may be combined with other driveline torque smoothing techniques to improve vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
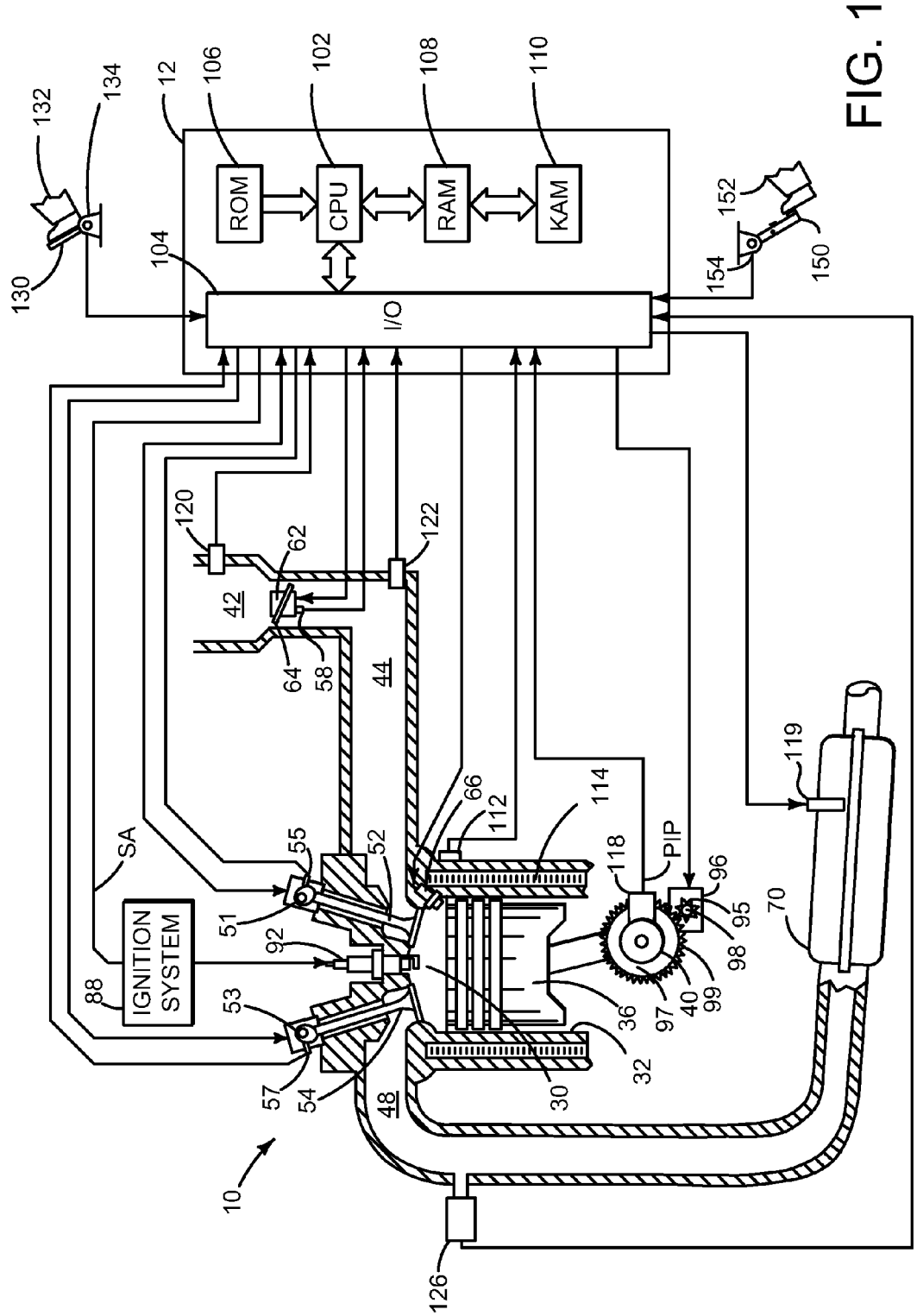
FIG. 1 is a schematic diagram of an engine.
Figure 2:
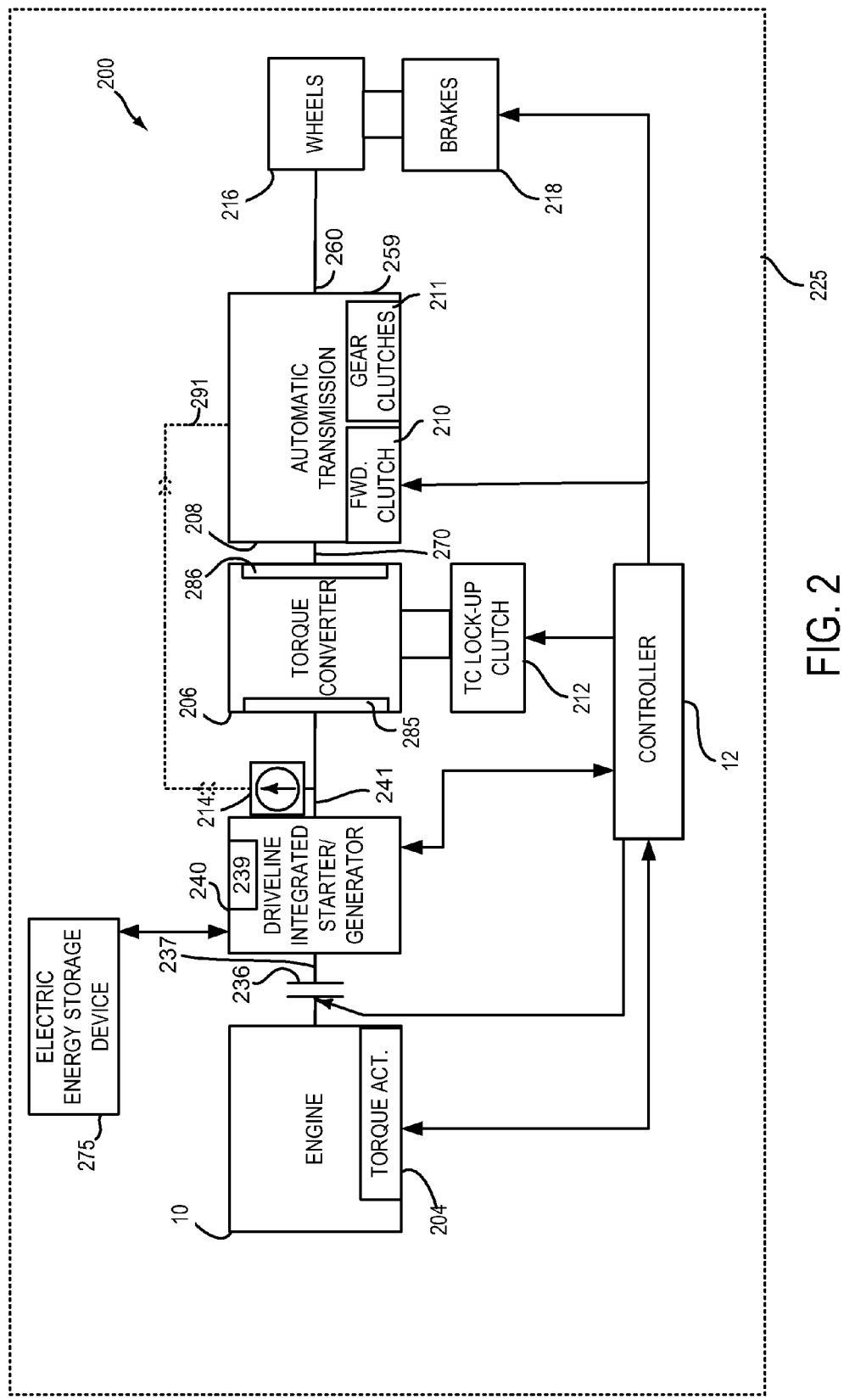
FIG. 2 shows an example vehicle driveline configuration.
Figure 3:
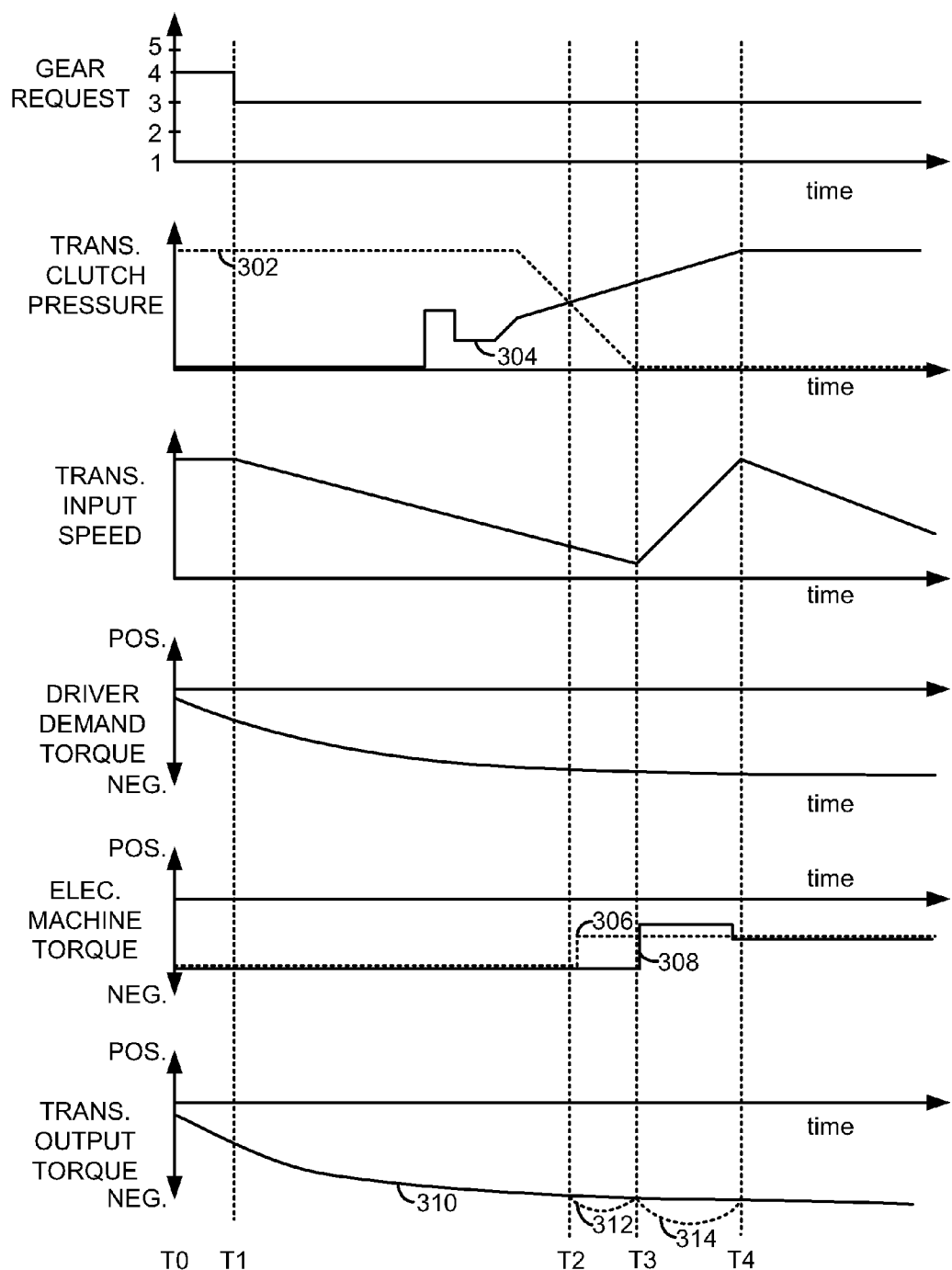
FIG. 3 shows an example transmission downshifting sequence during regenerative braking.

The present description is related to improving transmission shifting of a hybrid vehicle during regenerative braking. The hybrid vehicle may include an engine as is shown in FIG. 1. The engine may be mechanically coupled to other vehicle components to form a driveline as is shown in FIG. 2. The hybrid vehicle may include friction brakes and regenerative braking via an electric machine. FIG. 3 shows an example transmission downshift from a higher gear to a lower gear according to the method of FIG. 4. The hybrid vehicle may include executable instructions of the method of FIG. 4. The executable instructions may be incorporated into non-transitory memory.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 225. The driveline of FIG. 2 includes engine 10 shown in FIG. 1. Mechanical devices are shown using solid lines while hydraulic passages 291 are shown as dotted lines with arrows indicating transmission fluid flow direction.

Driveline 200 may be powered by engine 10. Engine 10 may be started with an engine starting system shown in FIG. 1 or via driveline integrated starter/generator (DISG) 240. Further, torque of engine 10 may be adjusted via torque actuator 204, such as a fuel injector, throttle, etc.

An engine output torque may be transmitted to an input side of driveline disconnect clutch 236. Disconnect clutch 236 may be electrically or hydraulically actuated. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 and mechanical transmission pump 214 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request. In alternative examples, torque converter 206 may be replaced by a launch clutch.

Automatic transmission 208 includes gear clutches (e.g., gears 1-7) 211 and forward clutch 210. The gear clutches 211 and the forward clutch 210 may be selectively engaged to propel a vehicle. Gear clutches 211 may be selectively applied and released to engage and disengage gears to provide fixed stepped ratio gearing. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling conditions before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 via passage 291 to provide hydraulic pressure to engage various clutches, such as forward clutch 210, gear clutches 211, and/or torque converter lock-up clutch 212. Mechanical oil pump 214 may be operated in accordance with torque converter 206, and it may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIG. 3 provides for a driveline system, comprising: an engine an electric machine; a driveline disconnect clutch selectively coupling the engine and the electric machine; a transmission coupled to the electric machine; and a controller including executable instructions stored in non-transitory memory for reducing a negative torque of the electric machine during a torque transfer phase of a downshift of the transmission while the electric machine is providing regenerative braking. The system further comprises additional instructions for further reducing the negative torque of the electric machine during an inertia phase of the downshift. The system includes where the downshift is a shift from a higher gear to a lower gear.

In some examples, the system includes where the driveline disconnect clutch is positioned between the engine and the electric machine. The system also includes further instructions for reducing the negative torque of the electric machine during the torque transfer phase in response to a transmission torque ratio. The system further comprises additional instructions to increase the negative torque of the electric machine in response to exiting an inertia phase of the downshift.

Figure 4:
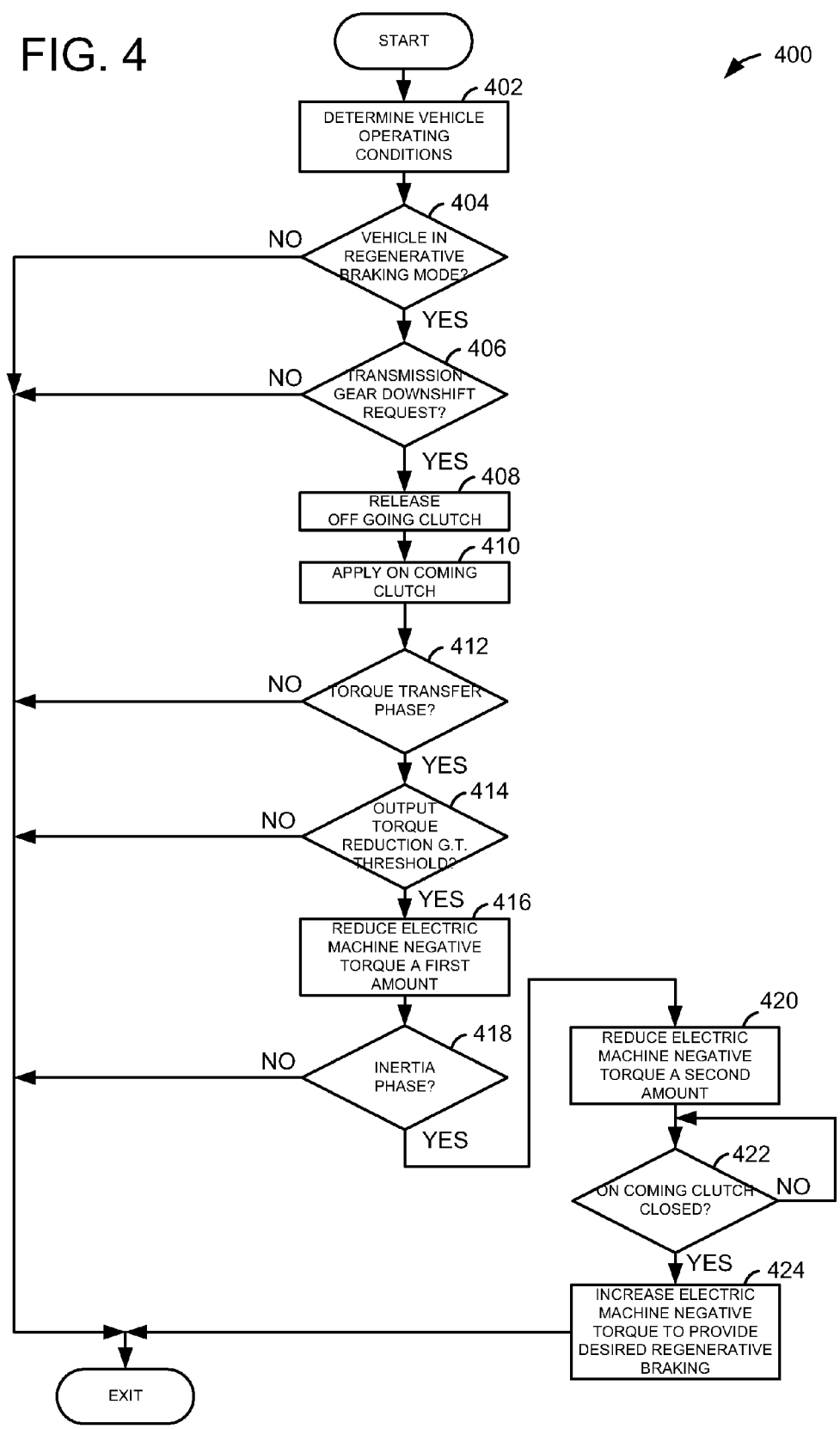
FIG. 4 is a flowchart of an example method for improving transmission shifting during regenerative braking.

Referring now to FIG. 3, a transmission downshifting sequence according to the method of FIG. 4 is shown. The sequence takes place during regenerative braking. The regenerative braking may occur when the vehicle is in a cruise control mode and traveling downhill such that the electric machine provides regenerative braking to maintain vehicle speed. Further, the regenerative braking may occur when driver demand torque is low and brakes are applied or during other conditions.

The first plot from the top of FIG. 3 is a plot of transmission gear requested versus time. The Y axis represents requested gear and the requested gear numbers are listed alongside the Y axis. The X axis represents time and time increases from the left side of FIG. 3 to the right side of FIG. 3.

The second plot from the top of FIG. 3 is a plot of transmission clutch pressure versus time. The Y axis represents transmission clutch pressure and transmission clutch pressure increases in the direction of the Y axis arrow. Transmission clutch pressure is related to a clutch's torque carrying capacity and clutch closing amount. Thus, a higher clutch pressure indicates the clutch with increased torque transmitting capacity and a clutch that is closed further. The X axis represents time and time increases from the left side of FIG. 3 to the right side of FIG. 3. Trace 302 represents clutch pressure for an off-going clutch (e.g., the fourth gear clutch). Trace 304 represents clutch pressure for an on-coming clutch (e.g., the third gear clutch).

The third plot from the top of FIG. 3 is a plot of transmission input shaft speed versus time. The Y axis represents transmission input shaft speed and transmission input shaft speed increases in the direction of the Y axis arrow. The X axis represents time and time increases from the left side of FIG. 3 to the right side of FIG. 3.

The fourth plot from the top of FIG. 3 is a plot of driver demand torque versus time. The Y axis represents driver demand torque and driver demand torque increases in the direction of the Y axis arrow. The X axis represents time and time increases from the left side of FIG. 3 to the right side of FIG. 3.

The fifth plot from the top of FIG. 3 is a plot of electric machine torque versus time. The Y axis represents electric machine torque and electric machine torque above the X axis increases in the direction of the Y axis arrow pointing to the top of FIG. 3. Electric machine torque below the X axis increases in the direction of the Y axis arrow pointing to the bottom of FIG. 3. Torque at the X axis level is zero torque. The X axis represents time and time increases from the left side of FIG. 3 to the right side of FIG. 3. Dotted line 306 represents electric machine torque during a downshift while the vehicle is in a regenerative braking mode and electric machine torque is reduced during only the torque transfer phase. Solid line 308 represents electric machine torque during a downshift while the vehicle is in a regenerative braking mode and electric machine torque is reduced during only the inertia phase.

The sixth plot from the top of FIG. 3 is a plot of transmission output torque versus time. The Y axis represents transmission output torque and transmission output torque increases in the direction of the Y axis arrow. The X axis represents time and time increases from the left side of FIG. 3 to the right side of FIG. 3. Solid line 310 represents transmission output torque when the driveline is controlled according to the method of FIG. 4. Dotted line 312 represents transmission output torque during the torque transfer phase when the method of FIG. 4 is not applied to the system. Dotted line 314 represent transmission output torque during the inertia phase when electric machine torque is not adjusted in the inertia phase according to the method of FIG. 4.

At time T0, the requested transmission gear is fourth gear. The off-going clutch pressure is high and it indicates that the off-going clutch has not started to be released. The on-coming clutch pressure is low indicating that the on-coming clutch has not been applied. The transmission input shaft speed is at a higher level and the driver demand torque is high and decreasing. The electric machine torque is negative and at a higher level indicating that the electric machine is providing driveline regenerative braking for the vehicle. Specifically, the electric machine is converting the vehicle's kinetic energy into electrical energy and slowing the vehicle as charge is produced by the electric machine. The transmission output torque is also decreasing. These conditions indicate that the vehicle is in a regenerative braking mode.

At time T1, a transmission downshift request from fourth to third gear occurs as indicated by the gear request trace transitioning to a lower gear. The transmission downshift may be responsive to vehicle speed, driver demand torque, and other vehicle conditions. The transmission clutch pressures remain at the same values they were at time T0. The transmission input speed is reduced as driver demand is reduced and electric machine negative torque remains at a greater level. Additionally, the transmission output torque decreases in response to the decreasing driver demand torque.

Between time T1 and time T2, the gear request remains at a level for requesting third gear and the off-going clutch pressure is being reduced as the on-coming clutch pressure is being increased. By lowering the off-going clutch pressure and increasing the on-coming clutch pressure, fourth gear begins to be opened or released and third gear begins to close or to be applied. The transmission input shaft speed is reduced in response to the reduced driver demand torque and the electric machine negative torque remains unchanged. The transmission output torque decreases with the decrease in driver demand torque.

At time T2, the torque transfer phase of the transmission gear shift begins. The torque transfer phase begins when the on-coming clutch pressure substantially equals the off-going clutch pressure (e.g., clutch pressures match within 10%). The electric machine negative torque of trace 306 is decreased to a first level based on a transmission torque ratio. The transmission input speed continues to decrease. The transmission output torque decreases in a smooth manner as the electric machine's negative torque is reduced as indicated by trace 310. Otherwise, if the electric machine's negative torque is not reduced electric machine torque follows trace 308. If electric machine torque follows trace 308, the transmission output torque has a "hole" or reduction that may be noticeable to a driver as shown at 312.

At time T3, the inertia phase of the transmission gear shift begins. The inertia phase begins when the off-going clutch pressure substantially equals zero (e.g., clutch pressure is within 10% of zero). The electric machine negative torque of trace 308 is decreased to a second level based on a transmission torque ratio and desired transmission output torque. If electric machine torque is reduced in the torque transfer phase and the inertia phase, electric machine torque follows trace 306 until time T3 where it then follows trace 308. The transmission input speed increases as the transmission output shaft is coupled to the transmission input shaft via the lower gear (e.g., third gear). The transmission output torque decreases only a small amount as the electric machine's negative torque is reduced a second time. Otherwise, if the electric machine's negative torque is not reduced, the transmission output torque has a "hole" or reduction that may be noticeable to a driver as shown at 314.

At time T4, the inertia phase of the transmission gear shift ends. The inertia phase ends when the on-coming clutch pressure reaches full application pressure (e.g., pump line pressure). The electric machine negative torque is increased to provide a desired level of regenerative braking to the vehicle. The transmission input speed decreases in response to the low driver demand torque. The transmission output torque remains relatively constant.

In this way, torque holes or changes in transmission output torque may be reduced. Electric machine negative output torque may be reduced during the inertia phase as indicated by trace 308, during the torque transfer phase as indicated by trace 306, or during both the inertia phase and the torque transfer phase as indicted by both traces 306 and 308.

Referring now to FIG. 4, a flowchart of an example method for improving transmission shifting of a hybrid vehicle during regenerative braking is shown. The method of FIG. 4 may be included in the system of FIGS. 1 and 2 as executable instructions stored in non-transitory memory. Further, the method of FIG. 4 may provide the operating sequence shown in FIG. 3.

At 402, method 400 vehicle operating conditions. Vehicle operating conditions may include but are not limited to vehicle speed, brake pedal position, driver demand torque, transmission input speed, and transmission clutch pressures. Method 400 may determine the operating conditions from output of sensors shown in FIGS. 1 and 2 or via inference. Method 400 proceeds to 404 after operating conditions are determined.

At 404, method 400 judges if the vehicle is in a regenerative braking mode. In one example, method 400 judges that the vehicle is in a regenerative braking mode when an electric machine in the driveline is outputting charge to charge a vehicle battery. If method 400 judges that the vehicle is in regenerative braking mode, the answer is yes and method 400 proceeds to 406. Otherwise, the answer is no and method 400 proceeds to exit.

At method 400 judges if a transmission downshift from a higher gear to a lower gear (e.g., from fourth gear to third gear) is requested. In one example, method 400 judges if a downshift is requested based on a state of a variable stored in memory. If a value of the variable changes, a downshift is requested. If method 400 judges that a transmission downshift is requested, the answer is yes and method 400 proceeds to 408. Otherwise, the answer is no and method 400 proceeds to exit.

At 408, method 400 begins to release the off-going clutch. The off-going clutch for a downshift is a clutch that operates a higher gear during the downshift. For example, if a downshift from fourth to third gear is requested, the off-going clutch is the fourth gear clutch. The off-going clutch is released by reducing working fluid (e.g., oil) pressure supplied to the clutch. Method 400 proceeds to 410 after the off-going clutch begins to release.

At 410, method 400 begins to apply the on-coming clutch for the downshift. The on-coming clutch for a downshift is a clutch that operates a lower gear during the downshift. For example, if a downshift from fourth to third gear is requested, the on-coming clutch is the third gear clutch. The on-coming clutch is applied by increasing working fluid (e.g., oil) pressure supplied to the clutch. Method 400 proceeds to 412 after the on-coming clutch begins to be applied.

At 412, method 400 judges if the requested downshift has entered a torque transfer phase. During the torque transfer phase, torque transferred from the transmission input shaft to the transmission output shaft by the higher gear begins to be relayed to the lower gear. In one example, the torque transfer phase is entered when working fluid pressure supplied to the off-going clutch is equal to working fluid pressure supplied to the on-coming clutch. In other examples, the torque transfer phase may begin when a pressure of the working fluid in the off-going clutch is a first predetermined value and when pressure of the working fluid in the on-coming clutch is a second predetermined value. If method 400 judges that the transmission gear shift is in the torque transfer phase, the answer is yes and method 400 proceeds to 414. Otherwise, the answer is no and method 400 proceeds to exit.

At 414, method 400 judges if there is a reduction in transmission torque output greater than (G.T.) a threshold. A reduction in transmission output torque may be determined via a torque sensor or via inference based on transmission shaft output speed. If method 400 judges that a torque hole or transmission output torque is reduced, the answer is yes and method 400 proceeds to 416. Otherwise, method 400 proceeds to exit.

In one alternative example, method 400 may skip step 414 and simply proceed to step 416 whether or not there is an indication of transmission output torque reduction. In this way, electric machine torque may automatically occur during the torque transfer phase.

At 416, method 400 reduces the negative torque output by the electric machine to a first negative torque amount. In one example, the electric machine negative torque amount (e.g., transmission input torque) is reduced based on a desired transmission output torque as may be determined as described in U.S. Pat. No. 8,540,604 which is hereby fully incorporated for all intents and purposes. In one example, the transmission input torque may be determined via the following equation:

$$\tau_{in} = ((\tau_{out} + T_s)/(TR_{ideal} + C1))*(1/TR_{torque\_converter})$$

Where $\tau_{in}$ is the transmission input torque from the electric machine, $\tau_{out}$ is the desired transmission output torque, $T_s$ is the non-proportional transmission losses, $TR_{ideal}$ is the ideal transmission torque ratio, C1 is a proportional transmission loss coefficient, and $TR_{torque\_converter}$ is the torque converter torque ratio. The ideal transmission torque ratio is a function of the selected gear. The transmission proportional and non-proportional losses may be empirically determined and stored in memory which may be indexed at a later time via transmission operating conditions such as transmission input and output speed. The desired transmission output torque may be based on brake pedal position and vehicle speed to determine the desired transmission input torque which is commanded to the electric machine. The desired transmission input torque is determined based on the desired transmission output torque, the transmission torque ratio, and other parameters described above and the electric machine negative output torque is reduced to the desired transmission output torque. Method 400 proceeds to 416 after reducing the negative electric machine torque.

At 418, method 400 judges if the transmission gear shift is in an inertia phase. In one example, method 400 judges that the transmission shift is in an inertia phase when the transmission input shaft speed begins to increase. In some examples, the transmission input shaft speed may begin to increase when working fluid pressure in the off-going clutch is less than a threshold pressure. Alternatively, the transmission gear shift may be judged to be in the inertia phase when working fluid pressure in the off-going clutch is less than a threshold pressure. If method 400 judges that the transmission shift has entered an inertia phase, the answer is yes and method 400 proceeds to 420. Otherwise, the answer is no and method 400 proceeds to exit.

At 420, method 400 reduces the electric machine negative output torque to a second torque, the second torque less than the first torque. The electric machine negative torque may be reduced as described at 416, but the desired transmission output torque is further reduced as compared to the desired transmission output torque at 416 to determine the electric machine torque. Method 400 proceeds to 422 after the electric machine torque adjustment during the inertia phase is determined and applied.

At 422, method 400 judges whether or not the on-coming clutch is fully closed. The on-coming clutch may be determined to be fully closed when working fluid pressure in the on-coming clutch is greater than a threshold pressure. If method 400 judges that the on-coming clutch is fully closed, the answer is yes and method 400 proceeds to 424. Otherwise, the answer is no and method 400 returns to 422.

At 424, method 400 increases the electric machine negative output torque to provide the desired regenerative braking after the on-coming clutch is fully applied. The negative torque is increased to a level that provides the desired level of driveline braking. Method 400 proceeds to exit after the electric machine negative output torque is increased.

In this way, negative output torque of an electric machine may be adjusted. In some examples, selected steps such as step 420 may be skipped, or alternatively, performed so that electric machine output torque may be adjusted solely during the torque transfer phase, solely during the inertia phase, or during both the torque transfer and inertia phases.

Thus, the method of FIG. 4 provides for a method for operating a driveline, comprising: adjusting torque output of an electric machine during a torque transfer phase of a transmission shift from a first fixed gear ratio to a second fixed gear ratio while the electric machine is providing regenerative braking to the driveline. The method further comprises adjusting torque output of the electric machine during an inertia phase of the transmission shift from the first fixed gear ratio to the second fixed gear ratio. The method includes where the first fixed gear ratio is based on a higher gear than the second fixed gear ratio. The method includes where the electric machine outputs a negative torque to provide the regenerative braking.

In some examples, the method includes where the negative torque output is decreased via adjusting torque output of the electric machine during the torque transfer phase of the transmission shift. The method includes where the electric machine provides charge to a battery while providing regenerative braking to the driveline. The method includes where the torque transfer phase is a period beginning when pressure of an on-coming clutch is substantially equal to pressure of an off-going clutch. The method includes where the torque transfer phase is the period ending when pressure of the off-going clutch is substantially zero (e.g., less than 5 PSI).

The method of FIG. 4 also provides for a method for operating a driveline, comprising: decreasing a negative torque output of an electric machine to a first torque during a torque transfer phase of a transmission shift from a first fixed gear ratio to a second fixed gear ratio while the electric machine is providing regenerative braking to the driveline, the negative torque output decreased by an amount responsive to a transmission torque ratio. The method further comprises decreasing the first torque to a second torque during an inertia phase of the transmission shift. The method includes where the torque transfer phase is a period beginning when pressure of an on-coming clutch is substantially equal to pressure of an off-going clutch. The method includes where the torque transfer phase is the period ending when pressure of the off-going clutch is substantially zero. The method further comprises where decreasing the negative torque is in further response to a decrease in output torque of a transmission. The method includes where the second fixed gear ratio is different from the first fixed gear ratio, and where a transmission is downshifted from the first fixed gear ratio to the second fixed gear ratio.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a driveline, comprising:
in response to a reduction in transmission torque output being greater than a threshold,
reducing a negative torque output of an electric machine during a torque transfer phase of a transmission shift from a first fixed gear ratio to a second fixed gear ratio while the electric machine is providing regenerative braking to the driveline, and
reducing the negative torque output of the electric machine during an inertia phase of the transmission shift from the first fixed gear ratio to the second fixed gear ratio,
wherein the negative torque output reduction during the inertia phase is a smaller reduction than the negative torque output reduction during the torque transfer phase.

2. The method of claim 1, where the first fixed gear ratio is based on a higher gear than the second fixed gear ratio.

3. The method of claim 1, where the electric machine outputs the negative torque to provide the regenerative braking.

4. The method of claim 3, where the negative torque output is decreased via adjusting the negative torque output of the electric machine during the torque transfer phase of the transmission shift.

5. The method of claim 1, where the electric machine provides charge to a battery while providing the regenerative braking to the driveline.

6. The method of claim 1, where the torque transfer phase is a period beginning when pressure of an on-coming clutch is substantially equal to pressure of an off-going clutch.

7. The method of claim 6, where the torque transfer phase is the period ending when the pressure of the off-going clutch is substantially zero.

8. A method for operating a driveline, comprising:
decreasing a negative torque output of an electric machine to a first torque during a torque transfer phase of a transmission shift from a first fixed gear ratio to a second fixed gear ratio while the electric machine is providing regenerative braking to the driveline, the negative torque output decreased by an amount responsive to a transmission torque ratio, and
decreasing the first torque to a second torque during an inertia phase of the transmission shift,
wherein the decrease during the torque transfer phase is a larger decrease than the decrease during the inertia phase.

9. The method of claim 8, where the torque transfer phase is a period beginning when pressure of an on-coming clutch is substantially equal to pressure of an off-going clutch.

10. The method of claim 9, where the torque transfer phase is the period ending when the pressure of the off-going clutch is substantially zero.

11. The method of claim 8, further comprising where decreasing the negative torque output is in further response to a decrease in output torque of a transmission.

12. The method of claim 8, where the second fixed gear ratio is different from the first fixed gear ratio, and where a transmission is downshifted from the first fixed gear ratio to the second fixed gear ratio.

13. The method of claim 8, wherein the decreasing to the first torque and the decreasing to the second torque each occur responsive to a reduction in transmission torque output being greater than a threshold.

14. A driveline system, comprising:
an engine;
an electric machine;
a driveline disconnect clutch selectively coupling the engine and the electric machine;
a transmission coupled to the electric machine; and
a controller including executable instructions stored in a non-transitory memory for:
reducing a negative torque of the electric machine during a torque transfer phase of a downshift of the transmission while the electric machine is providing regenerative braking, and
further reducing the negative torque of the electric machine during an inertia phase of the downshift,
wherein the reduction during the torque transfer phase is a greater reduction than the reduction during the inertia phase.

15. The system of claim 14, where the downshift is a shift from a higher gear to a lower gear.

16. The system of claim 14, where the driveline disconnect clutch is positioned between the engine and the electric machine.

17. The system of claim 14, including the controller comprising further instructions for reducing the negative torque of the electric machine during the torque transfer phase in response to a transmission torque ratio.

18. The system of claim 14, the controller further comprising additional instructions to increase the negative torque of the electric machine in response to exiting the inertia phase of the downshift.

19. The system of claim 14, wherein the reducing of the negative torque and the further reducing of the negative torque each occur responsive to a reduction in transmission torque output being greater than a threshold.

* * * * *